United States Patent
Hofmann et al.

(10) Patent No.: US 6,471,927 B2
(45) Date of Patent: Oct. 29, 2002

(54) PROCESS FOR CONVERTING UREA INTO AMMONIA

(75) Inventors: Lothar Hofmann, Altenkunstadt; Klaus Rusch, Litzendorf, both of (DE)

(73) Assignee: Siemens Aktiengesellschaft, Munich (DE)

(*) Notice: Subject to any disclaimer, the term of this patent is extended or adjusted under 35 U.S.C. 154(b) by 45 days.

(21) Appl. No.: 09/776,952

(22) Filed: Feb. 5, 2001

(65) Prior Publication Data

US 2001/0016183 A1 Aug. 23, 2001

Related U.S. Application Data

(63) Continuation of application No. PCT/DE99/02320, filed on Jul. 28, 1999.

(30) Foreign Application Priority Data

Aug. 3, 1998 (DE) .......................... 198 34 980

(51) Int. Cl.⁷ ................ B01D 53/54; C01C 1/08
(52) U.S. Cl. ................ 423/239.1; 423/358
(58) Field of Search ................ 423/239.1, 358

(56) References Cited

U.S. PATENT DOCUMENTS

| | | | |
|---|---|---|---|
| 5,393,393 A | 2/1995 | Wan et al. | 204/157.43 |
| 5,470,541 A | 11/1995 | Koch et al. | 422/186 |

FOREIGN PATENT DOCUMENTS

| | | | |
|---|---|---|---|
| DE | 40 38 054 A1 | 6/1992 | B01D/53/38 |
| DE | 44 25 420 A1 | 7/1995 | B01D/53/94 |
| DE | 195 10 804 A1 | 6/1996 | B01D/53/94 |
| EP | 0 487 886 A1 | 6/1992 | B01D/53/36 |
| EP | 0 582 022 A1 | 2/1994 | C01C/1/08 |
| FR | 2 684 376 | 6/1993 | C07D/251/32 |

OTHER PUBLICATIONS

Apfelbaum et al.: "25—Benzene, Its Derivatives, and Condensed Benzenoid Compounds", Chemical Abstracts, vol. 123, 1995.

*Primary Examiner*—Wayne A. Langel
*Assistant Examiner*—Maribel Medina
(74) *Attorney, Agent, or Firm*—Laurence A. Greenberg; Werner H. Stemer; Gregory L. Mayback

(57) ABSTRACT

A microwave hydrolysis reactor for converting urea into ammonia has one or more reaction chambers into which a urea solution is fed via a feed device and a discharge device for discharging an ammonia-water mixture. A catalytic converter is arranged in the reaction chamber. A microwave-transmitting device allows irradiating so that energy is fed to the urea solution in the reaction chamber.

5 Claims, 1 Drawing Sheet

PROCESS FOR CONVERTING UREA INTO AMMONIA

CROSS-REFERENCE TO RELATED APPLICATION

This application is a continuation of copending International Application No. PCT/DE99/02320, filed Jul. 28, 1999, which designated the United States.

BACKGROUND OF THE INVENTION

Field of the Invention

The invention relates to a process for converting urea into ammonia.

In installations for the selective catalytic deNoxing (selective catalytic reduction, SCR) of flue gases, in particular of flue gases of a stationary power plant or a diesel engine, gaseous ammonia or an ammonia-water mixture is usually used as the reducing agent. Then, at a so-called SCR catalytic converter, the nitrogen oxides are also converted, in the presence of oxygen with the reducing agent ammonia, into nitrogen and water. There are strict safety regulations imposed on the transport, storage, and handling of ammonia. Urea, by contrast, is a relatively harmless substance. The technical problem of hydrolysis, i.e. of converting urea into ammonia, and the injection of the urea into the SCR reactor are factors which militate against the direct use of urea as reducing agent in a SCR reactor.

The use of urea in SCR reactors has hitherto only been known in the context of small installations, such as for example thermal power plant units or for diesel engines, in which the urea is injected directly into the SCR reactor generally with the aid of compressed air. For a system with a plurality of nozzles, the flow of urea needs to be regulated for each individual nozzle, which is technically complex.

SUMMARY OF THE INVENTION

The object of the present invention is to provide a method of converting urea to ammonia which helps overcome the above-noted deficiencies and disadvantages of the prior art devices and methods of this general kind, and which provides ammonia for the deNoxing of flue gases in a form which is as simple as possible and is easy to handle from a safety aspect.

With the above and other objects in view there is provided, in accordance with the invention, a process for converting urea into ammonia, which comprises:

feeding an aqueous urea solution to a reaction chamber;
flowing the aqueous urea solution through a catalytic converter in the reaction chamber and thereby catalytically converting urea into ammonia;
introducing additional energy into the reaction chamber by irradiating with microwaves; and
discharging an ammonia-water mixture formed in the reaction chamber from the reaction chamber.

In accordance with an added feature of the invention, the aqueous urea solution is conducted in the catalytic converter through capillary tubes containing a catalytically active substance. The active catalyst substance may be located on an inner surface of the tubes.

In accordance with an additional feature of the invention, the microwave irradiation is adjusted such that the ammonia evaporates together with water in the reaction chamber.

In accordance with a concomitant feature of the invention, the ammonia-water mixture is admixed as a reducing agent to a flue gas, and the mixture is fed to an SCR reactor together with the flue gas. There results a deNOxing reaction in the SCR catalyst so that the nitrogen oxides are removed from the flue gas.

In summary, the invention allows converting urea into ammonia, which can subsequently be used for deNOxing. The conversion is effected in a hydrolysis reactor using microwaves.

Other features which are considered as characteristic for the invention are set forth in the appended claims.

Although the invention is illustrated and described herein as embodied in a process for converting urea into ammonia, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
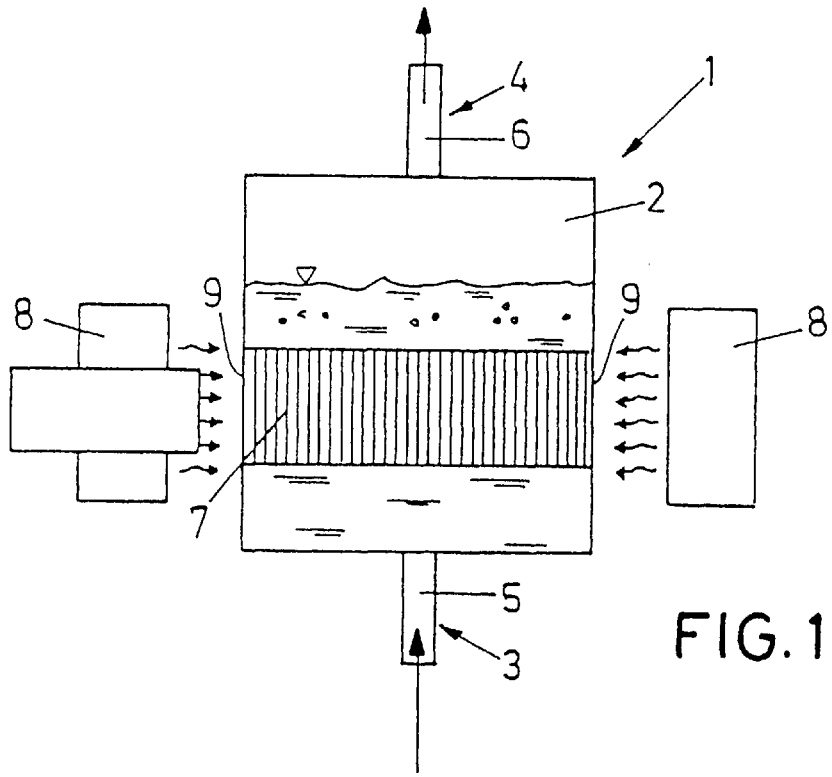
FIG. 1 is a diagrammatic side view of a microwave hydrolysis reactor according to a first exemplary embodiment of the invention.

Referring now to the figures of the drawing in detail and first, particularly, to FIG. 1 thereof, there is seen a microwave hydrolysis reactor 1, which is used to convert urea into ammonia on an industrial scale. The ammonia produced is fed to a SCR reactor which is part of a flue-gas deNOxing plant. Nitrogen oxides present in the flue gas, together with ammonia, are catalytically converted in the SCR reactor, in the presence of oxygen, to form nitrogen and water. As a result, the nitrogen oxides Nox are removed from the flue gas.

The microwave hydrolysis reactor 1 has a reaction chamber 2 which, with the exception of a feed device 3 and a discharge device 4, is closed on all sides. The feed device 3 is designed as a line 5 which communicates with the reaction chamber 2. The discharge device 4 is designed as a line 6 which is in communication with the reaction chamber 2.

The lines 5 and 6 are disposed at opposite ends of the reaction chamber 2.

A catalytic converter 7, which is designed as a surface catalytic converter with a catalytically active substance, is provided inside the reaction chamber 2, between the feed device 3 and the discharge device 4. This catalytically active substance may be provided in the form of sponge- or honeycomb-like materials or in the form of a catalyst bed. Commercially available products are used as the catalytically active substance. A microwave-transmitting device 8, which radiates microwaves into the reaction chamber 2, is provided in the region of the catalytic converter 7, outside the reaction chamber 2. At least in the region of the catalytic converter 7, the walls 9 of the reaction chamber 2 are designed to allow microwaves to pass through, i.e., the walls 9 are microwave-permeable.

When the microwave hydrolysis reactor 1 is operating, the feed device 3 feeds an aqueous urea solution to the reaction chamber 2. The solution penetrates through the catalytic converter 7, where it is heated by the microwaves from the microwave-transmitting device 8. The catalytically active substance reduces the temperature level and the energy which needs to be employed for the urea to be hydrolyzed so as to form ammonia. The latter is discharged together with steam by the discharge device 4. This mixture can then be used in a SCR reactor for the deNOx reactions. The catalytically active material is active for the hydrolysis and may be based, for example, on $TiO_2$.

As a result of the combination of catalytic converter, microwaves, and an aqueous urea solution, no by-products which are undesirable for the SCR application of the ammonia, such as cyanuric acid, melamine, or the like, are formed.

Figure 2:
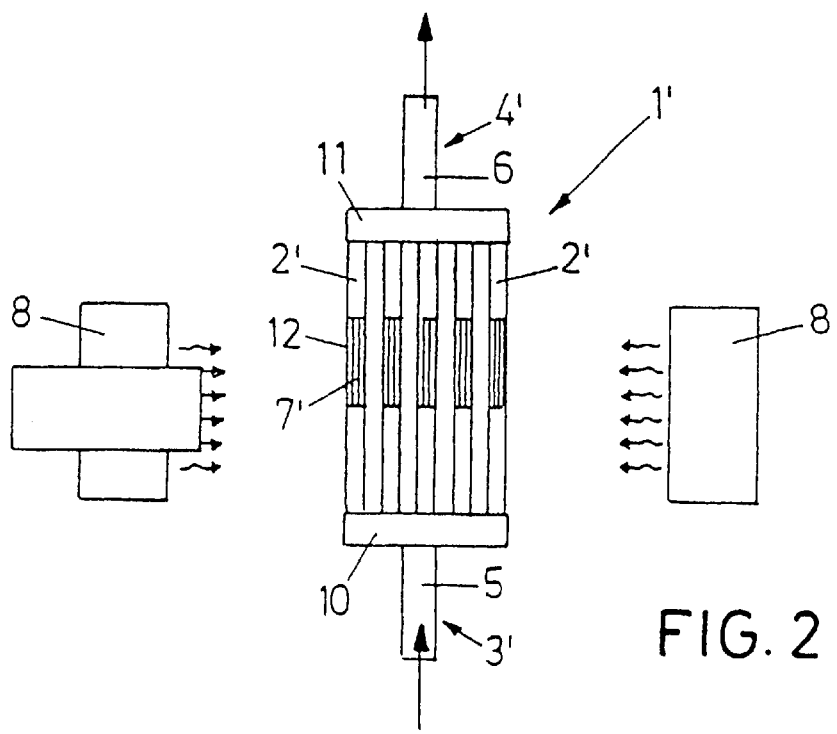
FIG. 2 is a diagrammatic side view of a microwave hydrolysis reactor according to a second exemplary embodiment.

Referring now to FIG. 2, there is illustrated a second embodiment of the invention. With regard to the description, reference is made to the first embodiment. Identical parts are denoted by the same reference numeral. Parts which are different but have an equivalent function are denoted by reference numerals identified with a prime symbol. Only the differences are described below.

In a microwave hydrolysis reactor 1', the feed device 3' has a manifold 10 which is connected to the line 5. The discharge device 4' has a manifold 11 which is connected to the line 6. A plurality of, for example five, reaction chambers 2', which are designed as capillary tubes 12, are provided between the manifold 10 and the manifold 11. At their end sides, these reaction chambers are connected to the manifolds 10, 11 for guiding a liquid from the feed device 3' to the discharge device 4'. Catalytic converters 7' are provided in the capillary tubes 12. In a specific and particular configuration, the capillary tubes 12 are formed from catalytically active substance.

Reference is had to the description of the first exemplary embodiment above with regard to the conversion of the urea solution in the capillary tubes 12 to form ammonia.

We claim:

1. A process for converting urea into ammonia, which comprises:

feeding an aqueous urea solution to a reaction chamber;

flowing the aqueous urea solution through a catalytic converter in the reaction chamber and thereby catalytically converting urea into ammonia;

introducing energy into the reaction chamber by irradiating with microwaves; and discharging an ammonia-water mixture formed in the reaction chamber from the reaction chamber.

2. The process according to claim 1, which comprises conducting the aqueous urea solution in the catalytic converter through capillary tubes containing a catalytically active substance.

3. The process according to claim 1, which comprises conducting the aqueous urea solution in the catalytic converter through capillary tubes containing a catalytically active substance on an inner surface thereof.

4. The process according to claim 1, which comprises introducing the microwaves such that the ammonia evaporates together with water in the reaction chamber.

5. The process according to claim 1, which comprises admixing the ammonia-water mixture as a reducing agent for deNOxing with a flue gas, and feeding the mixture to an SCR reactor together with the flue gas.

\* \* \* \* \*